United States Patent
Voit

(10) Patent No.: US 6,814,196 B2
(45) Date of Patent: Nov. 9, 2004

(54) FRICTION CLUTCH WITH SEPARATELY CONTROLLABLE TRANSMISSION BRAKE

(75) Inventor: Herbert Voit, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/374,486

(22) Filed: Feb. 26, 2003

(65) Prior Publication Data

US 2003/0168300 A1 Sep. 11, 2003

(30) Foreign Application Priority Data

Mar. 7, 2002 (DE) .......................................... 102 10 177

(51) Int. Cl.[7] .............................................. F16D 67/02
(52) U.S. Cl. ................. 192/13 R; 192/18 R; 192/18 A; 192/89.24; 188/166
(58) Field of Search ............................ 192/13 R, 18 A, 192/18 R, 89.24; 188/166, 170, 171, 192

(56) References Cited

U.S. PATENT DOCUMENTS

| | | | | | |
|---|---|---|---|---|---|
| 3,912,058 A | * | 10/1975 | Parkins | ..................... | 192/18 A |
| 3,942,617 A | * | 3/1976 | Poon | ..................... | 192/111 A |
| 4,108,295 A | * | 8/1978 | de Gennes | ............... | 192/111 A |
| 4,109,773 A | * | 8/1978 | Higgerson et al. | ........ | 192/111 A |
| 4,142,619 A | * | 3/1979 | Spokas | .................. | 192/113.35 |
| 4,512,450 A | * | 4/1985 | Babcock | ................... | 192/12 R |
| 4,579,203 A | * | 4/1986 | Link | ........................... | 192/15 |
| 4,848,531 A | * | 7/1989 | Gray et al. | ............... | 192/13 R |
| 5,443,143 A | * | 8/1995 | Tobiasz | ................. | 192/85 CA |
| 5,957,256 A | * | 9/1999 | Allen, Jr. et al. | ......... | 192/13 R |
| 6,591,954 B2 | * | 7/2003 | Aker | ........................ | 192/13 R |
| 6,622,836 B2 | * | 9/2003 | Otto et al. | ................ | 192/18 A |

FOREIGN PATENT DOCUMENTS

DE 32 29 052 A1 2/1984 ........... F16D/13/75

* cited by examiner

Primary Examiner—Charles A. Marmor
Assistant Examiner—Eric M. Williams
(74) Attorney, Agent, or Firm—Cohen, Pontani, Lieberman & Pavane

(57) ABSTRACT

A friction clutch, particularly for a motor vehicle, including a clutch disk which can be coupled in frictional engagement with the crankshaft of an internal combustion engine and which is connected by a hub to a transmission input shaft so as to be fixed with respect to rotation relative to it and can revolve with the latter around a common axis of rotation. The clutch further includes an actuation system for engaging or disengaging the frictional engagement of the clutch disk which is arranged concentric to the transmission input shaft, and a transmission brake for reducing the rotational speed of the transmission input shaft during determined shifting processes of the transmission. The transmission brake can be controlled independent from the actuation system of the friction clutch, and all component parts of the transmission brake are integrated in the actuation system of the friction clutch.

7 Claims, 2 Drawing Sheets

FRICTION CLUTCH WITH SEPARATELY CONTROLLABLE TRANSMISSION BRAKE

BACKGROUND OF THE INVENTION

1. Field of the Invention

The present invention is directed to a friction clutch, particularly for a motor vehicle, including a clutch disk which can be coupled in frictional engagement with the crankshaft of an internal combustion engine and which is connected by a hub to a transmission input shaft so as to be fixed with respect to rotation relative to it and can revolve with the latter around a common axis of rotation. The clutch includes an actuation system for producing or canceling the frictional engagement of the clutch disk which is arranged concentric to the transmission input shaft, and a transmission brake for reducing the rotational speed of the transmission input shaft during determined shifting processes of the transmission.

2. Description of the Related Art

U.S. Pat. No. 4,579,203 discloses a friction clutch with a transmission brake in which the actuation system of the friction clutch can execute an additional path following the normal actuation path for the friction clutch in order to activate the transmission brake. The transmission brake includes a brake disk which is arranged on the transmission input shaft so as to be fixed with respect to relative rotation but so as to be axially displaceable and which, in order to carry out its function, can be pressed by the actuation system of the friction clutch against the transmission housing. A construction of this type is disadvantageous due to the fact that the actuation system of the friction clutch must be designed in such a way that it can execute a greater path than is required for the actuation of the friction clutch. This means, for example, that the forces required for actuation of the friction clutch cannot be adapted in an optimal manner to the actuation path. Further, a costly device for wear compensation and for maintaining the constancy of the actuation paths are provided in the prior art.

SUMMARY OF THE INVENTION

It is an object of the present invention to provide a friction clutch including a transmission brake which enables an optimal clutch actuation and at the same time actuation of the transmission brake in a predetermined manner.

According to the present invention, this object is met by providing a friction clutch for a motor vehicle, that includes a clutch disk which can be coupled in frictional engagement with a crankshaft of an internal combustion engine. The clutch disk is connected to a transmission input shaft so as to be fixed with respect to rotation relative thereto and can revolve with the transmission input shaft around a common axis of rotation. The friction clutch includes an actuation system for engaging or disengaging the frictional engagement of the clutch disk which is arranged concentric to the transmission input shaft; and a transmission brake for reducing a rotational speed of the transmission input shaft during the shifting of the transmission. The transmission brake is actuated independently from the actuation system. By separating the clutch actuation and the actuation of the transmission brake, it is possible to orient the actuation system to the friction clutch in an optimal manner regardless of the actuation paths of the transmission brake.

According to another advantage of the present invention, all component parts of the transmission brake are integrated in the actuation system of the friction clutch and the friction clutch acts directly on the transmission input shaft. This construction substantially simplifies the handling of the entire actuation system, e.g., during assembly or during disassembly. Further, the direct action of the transmission brake on the transmission input shaft enables an arrangement that is independent from any existing transmission housing.

The actuation of the transmission brake is preferably carried out pneumatically. A pneumatic actuation of the transmission brake is advantageous insofar as there is a high degree of independence with respect to the transmission of the pneumatic medium; further, slight leakiness need not lead to any interference in the actuation system or in the friction clutch.

According to another advantage of the present invention, the actuation system includes a clutch release which is arranged so as to be axially displaceable concentric to the transmission input shaft. The transmission brake can advantageously be integrated in this clutch release.

The clutch release includes a sliding sleeve which carries a clutch release bearing on the side facing the friction clutch. The clutch release bearing communicates with the actuation elements of the friction clutch by its revolving bearing ring. At the same time, a piston is arranged concentrically in the sliding sleeve on the side of the latter facing away from the clutch release bearing. Due to this construction, the sliding sleeve is provided on one of its axial sides with the clutch release bearing and on the other axial side with the piston, so that the two elements are spatially separated from one another.

When the transmission brake is actuated, the piston executes a movement away from the friction clutch. Therefore, the transmission brake can be set in operation by means of the preferably pneumatic movement of the piston, independent from the actuation of the friction clutch.

A brake disk is arranged between the piston and the transmission-side end of the sliding sleeve, which brake disk engages in an external toothing of the transmission input shaft with an internal toothing so as to be axially displaceable but fixed with respect to relative rotation. The outer radial portion of the brake disk can be connected to the sliding sleeve in a frictional engagement. Due to this construction, all component parts of the transmission brake are integrated within the actuation system of the friction clutch.

The sliding sleeve further includes a device for preventing rotation relative to a stationary housing part. This rotation preventing device transmits the forces which are generated during the braking process of the transmission input shaft.

A pressure plate and a stop plate are arranged following the piston in the direction of the transmission, and the brake disk can be clamped between the pressure plate and stop plate. The stop plate is held at the sliding sleeve so as to be fixed with respect to rotation relative to it and so as to be fixed axially. Consequently the brake disk can be integrated in the actuation system of the friction clutch on one hand and can be clamped in by its friction surfaces from both sides on the other hand. The stop plate forms a fixed axial stop, while the pressure plate is arranged so as to be axially displaceable and is actuated by the piston.

Preferably, the sliding sleeve is mounted on the transmission input shaft by the revolving bearing ring of the clutch release bearing so as to be axially displaceable. This results in an especially simple construction and is independent from the design of and from the axial distance of a transmission housing.

The sliding sleeve has two projections which extend out approximately radially outward. A clutch release fork which is rotatably mounted at a housing part engages at these two projections for actuating the friction clutch, wherein a means for preventing rotation is provided between the sliding sleeve and clutch release fork. In this way, the clutch release fork which is fastened to a housing part in any case is utilized additionally as a torque support during the actuation of the transmission brake.

Other objects, advantages, and features of the present invention will be apparent from the following detailed description of a specific embodiment thereof when read in conjunction with the accompanying drawings.

DESCRIPTION OF THE PRESENT PREFERRED EMBODIMENT

Figure 1:
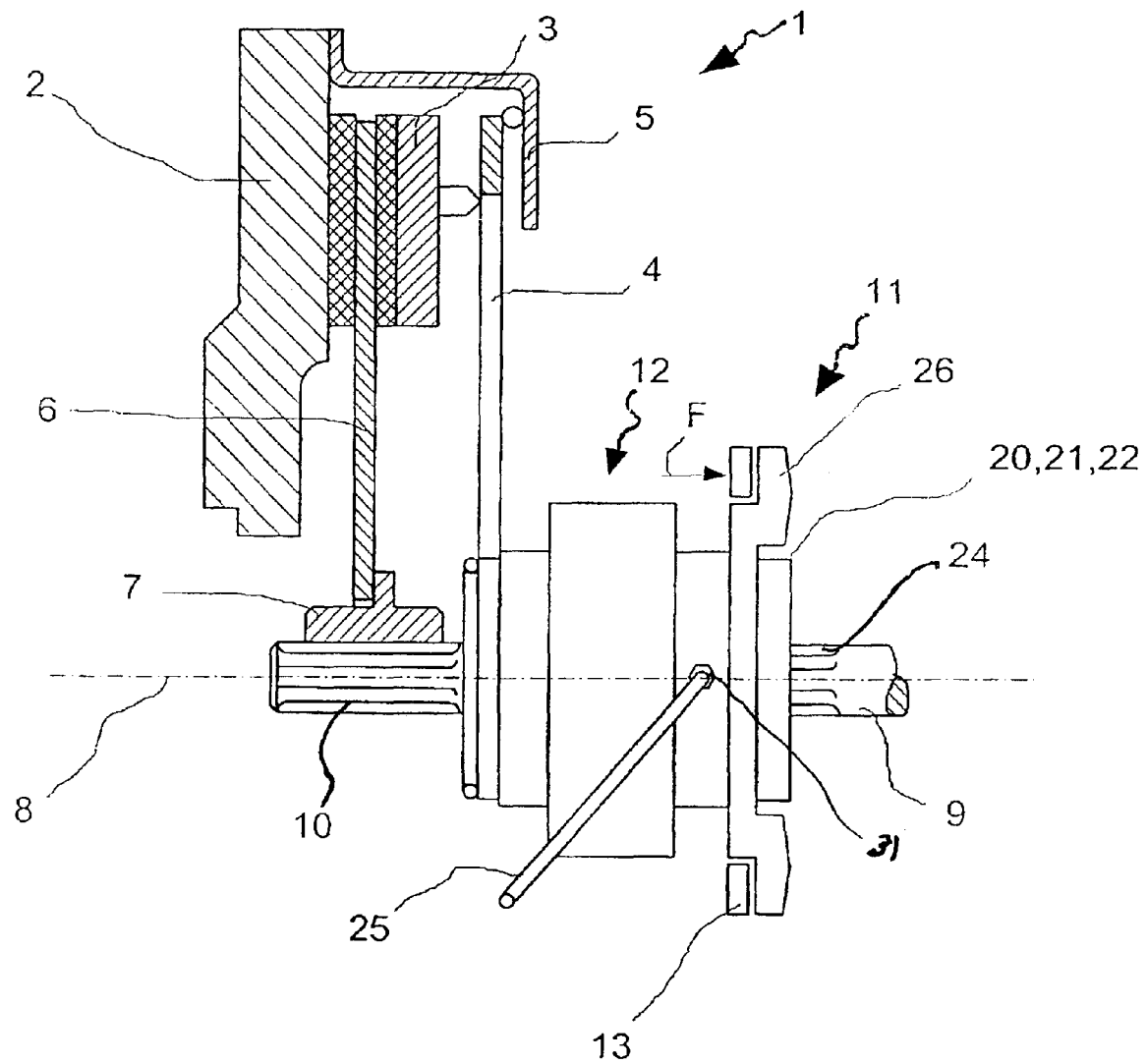
FIG. 1 is a cross-sectional longitudinal view of the upper half of a friction clutch with a view of the actuation system in accordance with the present invention.

FIG. 1 shows the general construction of a friction clutch 1 with its actuation system 11. Only the upper half of the friction clutch 1 in longitudinal section is shown in FIG. 1. Flywheel 2 is fixedly arranged on a crankshaft of an internal combustion engine, not shown. The crankshaft and the flywheel 2 revolve about axis of rotation 8. Concentric about axis of rotation 8 is a transmission input shaft which extends facing away from the friction clutch 1 in the direction of the transmission, not shown. On its end facing the friction clutch 1, the transmission input shaft 9 has an external gearing 10 for receiving a hub 7 of a clutch disk 6 such that the hub 7 is fixed with respect to relative rotation. In its radial outer area, the clutch disk 6 has friction linings which are clamped between the flywheel 2 and a pressure plate 3 for transmitting a torque from the crankshaft to the transmission input shaft 9. A clutch housing 5, which extends at a distance from pressure plate 3 is affixed to the flywheel 2. A diaphragm spring 3 is provided between the clutch housing 5 and the pressure plate 3. The diaphragm spring 4 is supported on one side by the clutch housing 5 and on the other side by the pressure plate 3, so that a frictional clamping of the clutch disk between the pressure plate 3 and the flywheel 2 is made possible by the inherent tension of the diaphragm spring 4.

An actuation system 11 is arranged concentrically to the axis of rotation 8 and to the transmission input shaft 9, and is displaceable in the axial direction for disengaging the clutch disk. The actuation system 11 includes a clutch release 12 and a clutch release bearing 15 whose circumferential bearing ring 16 is in working engagement with the diaphragm spring 4. Further, the actuation system 11 includes two radially protruding projections 26 and a clutch release fork 13 which acts at the projections 26.

Returning to FIG. 1, clutch release fork 13 is pivotably mounted to the housing of a transmission or similar structure; neither is shown in FIG. 1. When the clutch release fork 13 is actuated to disengage the friction clutch 1, it exerts a force F, corresponding to arrow F, on the projections 26. Consequently, clutch release 12 moves away from the friction clutch 1 and releases the clamping force of the diaphragm spring 4. In turn, the clutch disk 6 can rotate freely between the flywheel 2 and the pressure plate 3. Conversely, the friction clutch 1 is engaged by the reapplication of clutch release 12 in the opposite direction.

FIG. 1 shown a pull type friction clutch wherein the diaphragm spring 4 causes the clutch disk 6 to disengage when clutch release 12 moves away from the friction clutch 1, i.e. when clutch release 12 is released. In push type friction clutches, clutch release 12 releases friction clutch 1 when clutch release 12 is moved toward friction clutch 1. Conversely, friction clutch 1 may also be frictionally engaged when actuation elements exert an external force that acts on clutch release 12. Therein, these actuation elements may be similar to diaphragm spring 4, but without being pre-tensioned as for example by spring tension.

As shown in FIG. 1, clutch release 12 is provided with a pressure connection 25 connectable to a hydraulic or pneumatic medium. Pressure connection 25 may be used advantageously to conduct the pneumatic pressure medium into the clutch release 12 in order to actuate the transmission brake 20, 21, 22. As described further herein, transmission brake 20, 21, 22 acts directly on the transmission input shaft 9 by means of an external gearing 24 provided in the area of the transmission brake 20, 21, 22.

Pneumatic actuation is generally preferred because it advantageously uses compressed air that is already present in vehicles, such as trucks, that utilize a transmission brake. Further, the pneumatic actuation is even capable of functioning when slight leakiness occurs, since this does not impair the function of the friction clutch.

Figure 2:
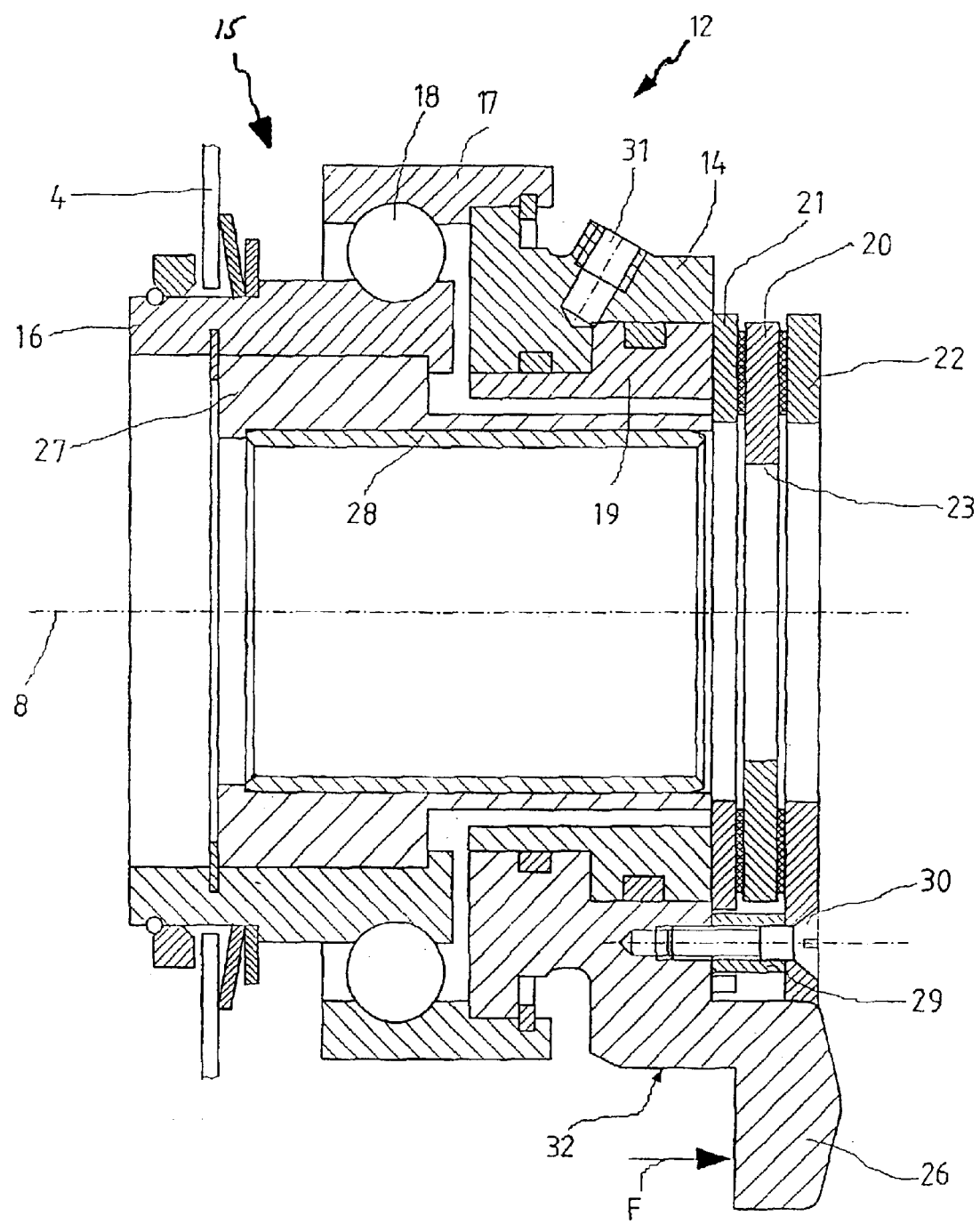
FIG. 2 is a cross-sectional longitudinal view of through the actuation system with the clutch release and the transmission brake in accordance with the present invention.

FIG. 2 shows the internal construction of the transmission brake. Therein, FIG. 2 shows the longitudinal section through the clutch release 12 which is arranged concentric to the axis of rotation 8 and to the transmission input shaft, not shown in FIG. 2. The clutch release 12 includes a sliding sleeve 14 which carries a clutch release bearing 15 on its end facing the friction clutch. The outer ring 17 of the clutch release bearing 15 is fixedly connected to the sliding sleeve 14 and the inner ring 16 revolves with parts of the diaphragm spring 4. Rolling bodies, balls 18 in the present case, are provided between the two parts 16, 17. When the clutch release is actuated by means of the release fork, a force F is exerted in the direction of arrow F on the projections 26 of the sliding sleeve, so that the entire clutch release 12 is moved to the right, relative to FIG. 2, and the diaphragm spring 4 can be released by means of the parts of the clutch release bearing 15.

Further, a piston 19 is inserted into the sliding sleeve 14 which is a stepped piston and is sealed relative to the sliding sleeve 14 by corresponding seals. The piston 19 can be provided with the pressure connection 25, shown in FIG. 1, by means of a threaded connection 31, so that the piston 19 can move relative to the sliding sleeve 14 by means of a preferably pneumatic medium, i.e. in the direction of the transmission (not shown), that is, away from the friction clutch. The piston 19 actuates the transmission brake which includes parts 20, 21, 22.

A pressure plate 21 is connected to the sliding sleeve 14 so as to be fixed with respect to rotation relative to it. Pressure plate 21 is axially displaceable and is arranged directly following the piston 19. The brake disk 20 is arranged following the pressure plate 21 and, toward the radial inner side, is provided with an internal toothing 23 which engages in the external toothing 24, shown in FIG. 1, of the transmission input shaft 9 so as to be fixed with respect to rotation relative to it. The external toothing 24 is extended in axial direction in such a way that an axial displacement of the brake disk 20 is possible during the engaging and disengaging process of the friction clutch 1.

A stop plate 22 is arranged at the sliding sleeve 14 so as to be fixed with respect to rotation relative to it and so as to be fixed axially. Stop plate 22 is provided following the brake disk 20. For this purpose, screws 30 are provided in the sliding sleeve 14 parallel to the axis of rotation 8 and determine the axial free space for the brake disk 20 and for the pressure plate 21 by means of spacer sleeves 29. The spacer sleeves 29 penetrate the brake disk 21 in corresponding openings, so that the latter is held so as to be fixed with respect to relative rotation but axially displaceable.

The clutch release 12 is mounted directly on the transmission input shaft 9 so as to be axially displaceable; namely, a ring 27 is arranged at the inner diameter of the inner ring 16 of the clutch release bearing 15, which ring 27 extends essentially over the entire axial extension of the clutch release bearing 12 and is provided toward the radial inner side with a sliding bushing 28. No relative rotation occurs between the sliding bushing 28 and the transmission input shaft 9 in the engaged state of the friction clutch 1.

In order to actuate the transmission brake when the friction clutch 1 is disengaged, compressed air is introduced into the sliding sleeve 14 via the pressure connection 25 and the threaded connection 31, so that the piston 19 is moved away from the sliding sleeve 14 in direction of the brake disk 20. In so doing, the piston 19 acts upon the pressure plate 21 with a provided force and clamps the brake disk 20 axially between itself and the stop plate 22. The transmission input shaft is likewise braked—through the toothing 23 and 24—by means of this frictional clamping. The reaction braking torque which occurs when braking the transmission input shaft 9 is transmitted to the sliding sleeve 14 via the pressure plate 21 and the stop plate 22. This sliding sleeve 14, in turn, is held by two supporting surfaces 32 located opposite one another at the clutch release fork 13 so as to be fixed with respect to relative rotation, so that the reaction braking torque is transmitted via the bearing support of the clutch release fork to a housing part, for example, to the transmission housing.

The transmission brake is controlled independently from the releasing path of the friction clutch. Care must be taken that the external toothing 24 in the transmission input shaft 9 has a correspondingly large axial extension, so that the internal gearing 23 of the brake disk 20 can engage in the external toothing 24 of the transmission input shaft 9 in a reliably operating manner regardless of the axial position of the sliding sleeve 14.

Integrating the transmission brake in the clutch release system results in independence from the wear state of the friction clutch. Further, the assembly and disassembly of the clutch release are greatly simplified. Further, the actuation of the transmission brake does not depend on whether or not the friction clutch is a pull-type or push-type clutch, and it is also possible to introduce the engaging force of the friction clutch via the clutch release system. The releasing process for actuation of the transmission brake can be carried out, for example, by means of the clutch pedal, namely, in the disengaged end position. Further, it is possible to introduce a shifting process by detection of the release path at the clutch release or also by means of detecting the path of the pressure plate.

Thus, while there have been shown and described and pointed out fundamental novel features of the invention as applied by a preferred embodiment thereof, it will be understood that various omission and substitutions and changes in the form and details of the devices illustrated, and in their operation, may be made by those skilled in the art without departing from the spirit of the invention. For example, it is expressly intended that the combination of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended to.

What is claimed is:

1. A friction clutch for a motor vehicle, the friction clutch comprising:

a clutch disk which can be coupled in frictional engagement with a crankshaft of an internal combustion engine and connected to a transmission input shaft so as to be fixed with respect to rotation relative thereto and which can revolve with said transmission input shaft around a common axis of rotation, the friction clutch acting directly on the transmission input shaft;

an actuation system, arranged concentrically to the input shaft, for engaging and disengaging the frictional engagement of the clutch disk, the actuation system comprising a sliding sleeve which is concentric to the transmission input shaft and axially displaceable relative to the transmission input shaft, the sliding sleeve carrying a clutch release bearing facing the clutch disk, the clutch release bearing having a revolving bearing ring which cooperates with actuation elements to engage and disengage the clutch disk, the actuation system further comprising a piston arranged concentrically in the sliding sleeve and facing away from the clutch release bearing, said piston being axially displaceable relative to said sliding sleeve during engaging and disengaging of the clutch disk; and a transmission brake for reducing the rotational speed of the transmission input shaft during shifting of the transmission, said transmission brake being integrated in the actuation system and being actuated independently of the actuation system, said transmission brake comprising a brake disk having internal teeth which engage external teeth on the transmission input shaft so as to be fixed against rotation relative to said input shaft and be axially displaceable relative to said transmission input shaft, and a radial outer area connected to the sliding sleeve in a friction engagement;

wherein the piston moves axially with respect to said sliding sleeve, away from the clutch disk and toward the brake disk, to actuate the transmission brake.

2. The friction clutch according to claim 1, wherein the actuation of the transmission brake is carried out pneumatically.

3. The friction clutch according to claim 1, wherein the sliding sleeve includes a device for preventing rotation of the sliding sleeve relative to a stationary housing part.

4. The friction clutch according to claim 3, wherein the sliding sleeve has two projections which project out approximately radially; and further comprising a clutch release fork rotatably mounted at a housing part for engaging the projections for actuating the friction clutch; and wherein said rotation preventing device is provided between the sliding sleeve and the clutch release fork.

5. The friction clutch according to claim 1, additionally comprising a pressure plate and a stop plate arranged following the piston in the direction of the transmission; said brake disk being clampable between the pressure plate and stop plate; the stop plate being held at the sliding sleeve so as to be fixed with respect to rotation relative thereto and so as to be fixed axially; and the pressure disk being fastened to the sliding sleeve so as to be fixed with respect to rotation relative thereto but axially displaceable.

6. The friction clutch according to claim 1, wherein the sliding sleeve is mounted so as to be axially displaceable on the transmission input shaft by the bearing ring of the clutch release bearing.

7. The friction clutch according to claim 1, additionally comprising a hub (7) for connecting said clutch disk (6) to said transmission input shaft.

* * * * *